(12) United States Patent
Varnell

(10) Patent No.: US 11,879,031 B2
(45) Date of Patent: Jan. 23, 2024

(54) LOW CRITICAL SOLUTION TEMPERATURE PURIFICATION OF OXAZOLINE POLYMER SOLUTIONS

(71) Applicant: SOLENIS TECHNOLOGIES, L.P., Wilmington, DE (US)

(72) Inventor: Daniel F. Varnell, Wilmington, DE (US)

(73) Assignee: Solenis Technologies, L.P., Wilmington, DE (US)

( * ) Notice: Subject to any disclaimer, the term of this patent is extended or adjusted under 35 U.S.C. 154(b) by 724 days.

(21) Appl. No.: 17/076,955

(22) Filed: Oct. 22, 2020

(65) Prior Publication Data

US 2022/0127389 A1 Apr. 28, 2022

(51) Int. Cl.
| | | |
|---|---|---|
| *C08F 6/12* | (2006.01) | |
| *C08F 6/28* | (2006.01) | |
| *B01D 17/04* | (2006.01) | |
| *C08F 20/56* | (2006.01) | |

(52) U.S. Cl.
CPC .............. *C08F 6/12* (2013.01); *B01D 17/042* (2013.01); *C08F 6/28* (2013.01); *C08F 20/56* (2013.01); *B01D 2257/80* (2013.01)

(58) Field of Classification Search
None
See application file for complete search history.

(56) References Cited

U.S. PATENT DOCUMENTS

| | | |
|---|---|---|
| 4,399,288 A | 8/1983 | McClure |
| 2004/0258910 A1 | 12/2004 | Haile et al. |
| 2009/0259005 A1 | 10/2009 | Kiss et al. |
| 2018/0318775 A1* | 11/2018 | de Vos .................. B01D 71/68 |
| 2022/0010068 A1* | 1/2022 | Hoogenboom ........ A61K 47/34 |
| 2023/0272157 A1* | 8/2023 | Hoogenboom ...... C08G 61/122 |
| | | 525/417 |

FOREIGN PATENT DOCUMENTS

WO 2014128607 A1 8/2014

OTHER PUBLICATIONS

"Molecular Modeling of Poly(2-ethyl-2-oxazoline)" a thesis by Ayanna Bernard, Georgia Institute of Technology, 2008.
R. Hoogenboom (2009), "Poly(2-oxazoline)s: A polymer class with numerous potential applications", Angew. Chem. Int. Ed., 48 (43), pp. 7978-7994.
Alan K. McClellan et al. (1984), "Separating Polymer Solutions Using High Pressure LCST Phenomena", University of Notre Dame, The Journal of Polymer Engineering and Science (AD-A151 538).
Alan K. McClellan et al. (1987), "Observations on the Effects of Shear and Relaxation Tines on the Phase Behavior of Polymer Solutions", The Johns Hopkins University, Fluid Phase Equilibria (AD-A176 252.
Diab et al. (2004), "Microcalorimetric Study of the Temperature-Induced Phase Separation in Aqueous Solutions of Poly(2-isopropyl-2-oxazolines)", Universite de Montreal.
ISA/US, International Search Report and Written Opinion issued in Int. Appl. No. PCT/US2021/071985 dated Jan. 24, 2022.

* cited by examiner

*Primary Examiner* — Megan McCulley
(74) *Attorney, Agent, or Firm* — Lorenz & Kopf, LLP

(57) ABSTRACT

Provided are methods for the purification of polymer solutions. In particular, the method enables the separation of impurities from an oxazoline polymer solution by raising the temperature of the polymer solution above its lower critical solution temperature (LCST), wherein a water rich phase and a polymer rich phase separation occurs. The phases are then separated with the polymer rich phase containing a lower amount of impurities than before separation.

20 Claims, No Drawings

LOW CRITICAL SOLUTION TEMPERATURE PURIFICATION OF OXAZOLINE POLYMER SOLUTIONS

TECHNICAL FIELD

The present disclosure generally relates to methods for the purification of polymer solutions. In particular, the method enables the separation of impurities from an oxazoline polymer solutions by raising the temperature of the polymer solution above its lower critical solution temperature (LCST) wherein a water/polymer phase separation occurs in which impurities are removed from the polymer phase.

BACKGROUND

Polymers may require purification to receive regulatory approval and to be safe to use where there is food contact, such as when used in certain paper grades. What is needed is an inexpensive means of removing impurities such as residual monomers, initiators, production aids, and materials that might form from such impurities, such as hydrolyzed monomers. This occurs with many polymers used in industries requiring regulatory approval, such as oxazolines. One such oxazoline polymer is poly-2-ethyl-2-oxazoline (PEOx) which may be used, for example, in adhesives or pharma or industrial applications. However, the polymer solutions may contain impurities, such as residual monomers and oligomers, initiators, production aids, and non-polymeric materials. It is desired to remove such impurities.

One application of oxazolines, such as PEOx, is as a paper additive to improve the adhesion of images printed by Hewlett Packard (HP) Indigo™ presses. The additive is applied to the paper which is then dried. As oxazolines can be easily extracted from the paper, levels of impurities need to be low to obtain regulatory approval, that is levels that are safe for paper applications involving food contact or for example the European BfR or United States FDA approvals. Therefore, it was desired that we create an aqueous oxazoline polymer based solution or dry product with levels of impurities that are below levels that are of concern in the industry.

For Example, PEOx is formed most commonly by a cationic ring opening polymerization of ethyl oxazoline. The polymerization method allows the PEOx to be made with a narrow molecular weight distribution. It can also be obtained as a polydispersed material having various molecular weights. An example of such material is available from Polymer Chemistry Innovations under the trade name Aquazol®. PEOx exhibits a lower critical solution temperature (LCST) as both a narrow and broad molecular weight composition. The LCST can vary with molecular weight with lower average molecular weight compositions having lower LCSTs.

The chemistry and LCST behavior of oxazolines, such as PEOx, may be found in R. Hoogenboom (2009), "Poly(2-oxazoline)s: A polymer class with numerous potential applications", *Angew. Chem. Int. Ed.*, 48 (43), pp. 7978-7994, and "Molecular Modeling of Poly(2-ethyl-2-oxazoline)" a thesis by Ayanna Bernard, Georgia Institute of Technology, 2008.

Gravity separation is a technique used in the chemical industry for separating different density liquids, such as removing oil from water. However, for a polymer solution, by the definition of a solution, there is no gravity difference by which impurities, such as those mentioned, can be removed. For polymer solutions, a purification of low molecular weight compounds and sometimes oligomers, is carried out by boiling off impurities or by utilizing some form of membrane filtration, wherein the separation occurs based on the size of molecules rather than insolubility.

Processes where high heat is required (steam stripping) can be inefficient or unfeasible. For example, impurities within PEOx, such as excess oligomers, cannot be removed by heating. For example the monomer has a boiling point of about 128° C.

The use of membrane filtration requires special equipment and therefore has production limitations. There remains a need for alternate methods of purification and in particular for removal of non-polymeric materials, non-volatile components or oligomers from a polymer.

Another known technique of purification uses high pressure LCST phenomena for separating polymer solutions as an alternate to steam stripping. This technique includes the use of mixed solvents such as hexane and pentane to obtain the phase separation of a poly(ethylene-co-propylene). Other techniques that were tried for the isolation and purification of water-soluble polyphosphazenes. However, the process resulted in one "sticky mass" of polymer from which the liquid phase was decanted away.

There is a continuing need for an effective and easier means of purification since conventional means of removing such impurities may require changes in the polymerization process, or may require some means of separation, such as membrane filtering.

SUMMARY

Provided is a method for the purification of an aqueous polymer solution containing one or more non-polymeric materials. In particular, provided is an aqueous oxazoline polymer solution containing one or more non-polymeric materials and wherein the oxazoline polymer has a molecular weight greater than a weight average of 5000. The temperature of the aqueous polymer solution is raised from a first temperature to a second temperature that is above the LCST is reached. The LCST is observed when the aqueous polymer solution separates into a water phase and a polymer phase. Unlike other materials when an oxazoline polymer solution is raised above the LCST the polymer phase continues to be a mixture of polymer and water and can at the correct temperature remain a flowable mixture. The water phase is separated from the polymer phase at this time wherein a portion of the impurities will remain with the water phase. After separating the water and polymer phases, the polymer phase is cooled until going back into a soluble polymer solution. The process of heating the polymer phase above its LCST, separating the subsequent water and polymer phases and cooling can be repeated as many times as desirable. Each time additional impurities will remain in the water phase.

Also, provided is a method for the purification of poly-2-ethyl oxazoline (PEOx). The method includes providing an aqueous solution containing one or more impurities and PEOx. The temperature of the aqueous solution is raised from a first temperature to a second temperature above the LCST wherein the aqueous solution separates into a lighter water rich phase and a cloudy more dense polymer rich phase. The polymer rich phase is separated from the less dense water phase. The lighter water phase containing a larger portion of the impurities. Following the separation of the phases the polymeric rich phase can be used as is, dried or diluted. The separation process can be performed as many times as desirable.

DETAILED DESCRIPTION

The following detailed description is merely exemplary in nature and is not intended to limit the present disclosure or the application and uses thereof. Furthermore, there is no intention to be bound by any theory presented in the preceding background or the following detailed description.

The current method uses the lower critical solution temperature (LCST) of a polymer solution to obtain an easier and less expensive method of purifying, separating and reducing chemical impurities from the polymer.

Certain polymers when in aqueous solution will exhibit what is known as a lower critical solution temperature (LCST). This is true with oxazoline polymers, such as poly-2-ethyl oxazoline (PEOx) in water. The LCST means that upon raising the temperature of the aqueous solution the polymer becomes less soluble. After reaching the LCST, the aqueous polymer solution separates into a cloudy more dense polymeric phase and a lighter aqueous phase with little polymer.

Few polymer solutions exhibit LCST behavior. Fewer still exhibit an LCST when in aqueous solution where the LCST temperature can be readily and easily obtained. Oxazolines, such as PEOx, is one such polymer that is soluble in water at room temperature and then becomes insoluble when the aqueous solution is heated. The LCST of PEOx is approximately 60° C., but varies with molecular weight.

It has been discovered that aqueous solutions of oxazoline polymers with LCST behavior, can be purified by raising the temperature of the aqueous polymer solution to its LCST point wherein two phases form—a more dense phase rich in oxazoline polymer and a water or lighter phase containing much of the impurities and very little or no oxazoline polymer and separating the two phases. Uniquely the polymer rich phase still contains a significant portion of water and at certain temperatures remains fluid with a viscosity such that the phase can be pumped through a pipe or tube.

In some aspects of the current method, a polymer solution comprising water and an oxazoline polymer is provided wherein the oxazoline polymer has weight average molecular weight greater than about 5,000 g/mol and wherein the polymer solution contains one or more impurities. The temperature of the polymer solution is raised from a first temperature to a second temperature that is above an LCST, wherein the polymer solution separates into an aqueous or water phase and a more dense polymer rich phase. Separation of the two phases occurs quickly by simple gravity or by using centrifugation techniques know in the industry. Advantageously the lighter water phase containing the majority of the water also contains proportionally the majority of impurities. Once the two phases have been separated, the polymer phase may be dried, diluted or used as is.

The more dense polymer rich phase can be cooled below its LCST, wherein the polymer re-dissolves into a soluble solution. The process of heating, separating and cooling the soluble polymer solution can be repeated to further reduce the level of impurities. The polymer phase can be cooled naturally, with artificial means or by addition of water to the polymer phase.

In some aspects of the current method, the oxazoline polymer solution is heated to a temperature above the LCST wherein the polymer rich phase maintains a significant water content and remains fluid. The proper selection of the temperature is critical. In one aspect of the invention the polymer rich phase comprises water and PEOx.

In one aspect of the current method, the oxazoline polymer solution is PEOx and has a LCST and the is heated to a temperature in the range of from about 65° C. to 85° C., can be from about 70° C. to about 85° C., and may be from about 75° C. to about 83° C. It was found that if the temperature of the polymer solution gets too high, the ease of pumping or separating the polymer rich phase from the water phase decreases. An optimal temperature range exists between ease of pumping or the ability of the polymer rich phase to flow and the degree of separation, that is the concentration of the polymer in the polymer rich phase.

In another aspect of the current method, the viscosity of the polymer rich phase is between 10 and 2000 cps or between 30 and 1000 cps.

In some aspects of the current method, the weight average molecular weight of the polymer is greater than about 50,000 g/mol and optionally greater than about 200,000 g/mol.

In one aspect of the current method, the process of separating the polymer rich phase from the aqueous or water phase may be accomplished in a single stage reactor.

In other aspects of the current method, the polymer rich phase may be pumped to a separate vessel for immediate use or for further purification.

In yet other aspects of the current method, the polymer rich phase may be separated from the aqueous or water phase by a continue flow process in which the polymer rich phase goes through equipment used for separation of phases such as for oil-water separation. Those familiar with gravity separation of oil and water phases will know what equipment is suitable for the separation process.

In other aspects of the current method, the polymer solution is provided as a continuous feed.

In some aspects of the method, the polymer solution further comprises a water-soluble aluminum salt.

In yet other aspects of the current method, the total amount of impurities is reduced by greater than 50 wt % compared with the starting weight % of the polymer of the polymer solution, can be reduced by greater than 65 wt %, and may be reduced by greater than 84 wt % of the polymer solution.

In some aspects of the current method, the impurities comprise residual monomers and oligomers, initiators, production aids, and non-polymeric materials.

In yet other aspects of the current method, the oxazoline polymer is PEOx and the impurity is residual oligomers. Oligomers represent a major concern to regulatory agencies concerning food contact of polymers. As mentioned above, there are issues with separating residual oligomers from PEOx by evaporating or boiling them off. Furthermore, oligomers closely resemble the polymer. Therefore, it was unexpected that the current process would be effective for reducing the level of oligomers in the polymer.

In yet other aspects of the current method, the level of oligomers in the polymer solution on a weight % basis is reduced by greater than 50 wt % compared with the starting weight % of the PEOx of the polymer solution, can be reduced by greater than 65%, and may be reduced by greater than 72 wt %, and may be reduced by greater than 80 wt % of the polymer solution.

In some aspects of the current method a temperature is selected wherein the polymer rich phase still flows freely but a desired purification is obtained. With the use of PEOx such a temperature of separation being between 65 and 85° C., or between 70 and 85° C., or between 75 and 83° C. The higher the temperature the great the degree of separation but the higher the viscosity of the polymer rich phase. Therefore, an optimum temperature range exists. The solids of the starting solution before heating above the LCST is selected such that the process may obtain a higher concentration of PEOx in the polymer rich phase compared to the starting solution of the process. The lower the starting solids, the greater the degree of purification. For example, a starting polymer solution of 5% solids may be increased to a solids of 20% by using a process temperature of about 80° C.

In some aspects of the current method, after phase separation of the water phase and polymer rich phase, there is a reduction in impurities in the polymer rich phase of up to about 50%, can be about 65%, and may be about 72%, and may be about 84% of the initial amount of impurities in the polymer solution as a weight percentage of the polymer.

It was also found that the upper water or lighter phase contained proportionally about the percentage of impurities equal to relative volume percentages of the two phases. Therefore, the polymer rich portion will necessarily contain less than the starting level of impurities and proportionally a lower amount of impurity per the level of polymer. Impurities can include residual monomers and oligomers, initiators, production aids, and non-polymeric materials.

An unexpected result of the current process was how the temperature affected the separation of the phases of the aqueous oxazoline solution and the ease of separating the phases. It was found that the degree of raising the temperature above the LCST increased the degree of separation of the polymer or more dense polymer rich phase from the lighter or water rich phase increased. That is the amount of water phase increased and the concentration of the polymer in the polymer phase increased. The PEOx used in the current studies below, did not drop out to form a pure or even highly concentrated polymer phase, but rather formed a polymer phase of a given concentration separated from an aqueous phase that contained little of no polymer. The concentration of the polymer in the polymer rich phase varied with the temperature of separation and so did the viscosity of the separation phase.

EXAMPLES

Test Methods

Solids was determined by use of a moisture balance such as sold by Mettler Toledo or Ohaus. Other standard methods, such as heating in an oven at 100° C. until weight loss ceases, may also be used. Ideally with polymer samples the amount of sample tested should remain small, such as 0.1 g, to avoid trapping of water.

Molecular Weight of Polymers

The molecular weight of the starting polymers were as reported by the supplier. They were also further analyzed by size exclusion chromatography.

Residual levels of the monomer 2-ethyl-2-oxazoline (EOx) and N-(2-hydroxyethyl)propenamide (NHEP) were measured in the starting polymer and different layers, as generated by the current method, by utilizing gas chromatography (GC) with mass spectroscopy analysis. Quantification was achieved by using a set of samples with known quantities with acetone as the solvent. 0.1 gram (g) of sample was added to a volumetric flask followed by acetone added to the 10 milliliter (ml) mark. Injection volume was 1 microliter (μm). Inlet temperature was 235° C. Gas chromatography oven temperature started at 50° C. and was increase at 30° C./min to 220° C. The mass spectrometer transfer line and ion source were at 280° C. Values were determined by peak areas.

Residual Level of Oligomers

Level of oligomers was determined by size exclusion chromatography. The mobile phase was tetrahydrofuran, the flow rate was 0.8 ml/minute, the column temperature was 40° C., and the calibration was done with polyethylene glycol standards. The concentration of the samples was 1 milligram per milliliter (mg/ml) and the injection volume was 50 microliters (μl). The level of oligomers was defined as the amount of PEOx with less than 1000 g/mole molecular weight and with the exclusion of other low molecular weight compounds.

Example 1

100 parts of a 20% solution of PEOx having a 500,000 weight average molecular weight was prepared in water. The solution was heated to 45° C. To the solution, with stirring, was added 100 parts of 80° C. water to form a 10% solution. The temperature of the mixture was raised, with stirring, to 67.3° C., which is above the LCST. Stirring was stopped and two layered phases formed. Samples of the two layers were removed. The bottom layer was the polymer rich phase and the top layer was mostly water with impurities. Both layers were very fluid with low viscosity. The polymer rich phase was taken and the process was repeated except that the temperature for separation (LCST) was at 80° C. At 80° C. the bottom layer clearly had a higher viscosity than when the separation was done at 67.3° C. The lower layer was still fluid and could be pumped. The process was repeated a third time with the separation temperature being 90° C. The polymer in the bottom layer formed a sticky paste and both layers were not clear. In all cases the bottom phase was rich in polymer and the top phase was almost entirely water. Table 1 below compares the characteristics of the two layers.

TABLE 1

| Separation Temp. ° C. | Solids of bottom phase | Concentration of monomer in bottom phase (ug/g) | Conc. of monomer to solids in bottom phase | Concentration of monomer in top phase | Conc. NHEP* in bottom phase | Conc. Of NHEP to solids in bottom phase | Conc. Of NHEP in top phase |
|---|---|---|---|---|---|---|---|
| 67.3 | 16.9% | <0.55 | <3.3 | 0.88 | 29.88 | 177 | 35.5 |
| 80 | 27.7% | 0.61 | 2.2 | 0.77 | 34.75 | 125 | 35.5 |
| 90 | 33.7% | 0.63 | 1.9 | 0.74 | 31.23 | 93 | 37.0 |
| Starting polymer | 20% solution | 1.73 | 8.6 | | 60.38 | 286 | |

*NHEP = N-(2-hydroyethyl)propenamide

All concentrations are as μg/g

If there were perfect separation of the layers the degree of purification, that is the % reduction of monomer and NHEP based on the different temperatures would be as follows in Table 2.

TABLE 2

% reduction of monomer and NHEP

| Temperature | % reduction of monomer | % reduction of NHEP |
| --- | --- | --- |
| 67.3 | >62 | 51 |
| 80 | 74 | 57 |
| 90 | 78 | 67 |

Reductions are on a basis of weight %.

It was further observed in the current example that the volume of water phase and polymer rich phase varied with temperature. This is reflected in the polymer solids of the two phases and by a further observation that there was essentially no, or very little polymer, contained in the upper water phase. The degree of purification was found to be proportional to the volume of the two phases.

Through the study it was found was that the viscosity of the polymer rich phase varied with the temperature of separation. In this respect, gravity separation methods are very much dependent on the viscosity of the two phases. Therefore, there is an optimum temperature dependent upon the polymer when separation occurs. It should be noted that the starting sample of polymer was almost entirely polymer with few impurities and thus the solids obtained in the lower phase was almost entirely polymer.

Example 2—Varying Concentration Levels

A 20% solution of PEOx of 500,000 weight average molecular weight in water was prepared. 100 parts of boiling water was added to a vessel. With constant stirring 144.2 g of the 20% polymer solution was then added to the vessel. Heating and while stirring was applied to raise the mixture temperature to 80° C. The polymer concentration after addition to the vessel was 11.8%. The stirring was stopped and two phases or layers formed, an aqueous water rich layer and a polymer rich layer. After 3 minutes the top aqueous layer was removed from the vessel leaving the polymer rich layer or phase. The time for separation can vary with the size of the batch used in the process. The process was repeated but with amounts adjusted to that the polymer concentration was 7.9%. The process was repeated a third time wherein the polymer concentration was 5.0%. In each case when stirring was stopped a separation of the phases or layers occurred.

The volume of the top aqueous layer removed was found to be dependent on the solids of the starting solution. Surprisingly, the solids concentration of the polymer rich phase remained about the same regardless of the starting overall polymer solids. It was further found that the solids of the polymer rich phase were dependent on the temperature rather than the starting solids. The results in Table 3, show that greater purification may be achieved in one pass of the process by starting with a lower solids solution.

TABLE 3

| Starting solids | Amount of top water phase | Amount of lower phase | Solids of lower phase | % of starting solids in lower phase * | Calculated Reduction of impurities |
| --- | --- | --- | --- | --- | --- |
| 11.8 | 51.2% | 48.8% | 24.4% | 101% | 51.2% |
| 7.9 | 64.8% | 35.2% | 23.3% | 104% | 64.8% |
| 5.0 | 80.0% | 20.0% | 24.4% | 101% | 80.0% |

* the slight increases above 100% are caused by losses of water due to evaporation during the processes. The trends of the results are in no way changed by such slight losses. The solids values were generated on all of the upper and all of the lower phases after the two phases were separated.

During the process of this example and others, it was observed that there is a region between the phases where it is difficult to differentiate between the two. For the current experiments that region was small and the small portion of the sample where separation was unclear was taken as part of the upper or aqueous portion as opposed to the lower polymer rich portion.

Example 3—Alum Addition

An aqueous polymer solution was prepared with 4.51% PEOx of 500,000 weight average molecular weight and 1.43% aluminum sulfate. The polymer solution was heated in a vessel with constant stirring to 80° C. Once the temperature reached 80° C. stirring was stopped and two phases or layers formed, an aqueous water rich layer and a polymer rich layer. The layers were separated. The top aqueous layer was 79.08% of the weight and the bottom polymer rich layer was 20.92%. The study showed a comparable separation of a 5% PEOx sample where the weight percentages of the layers were 76.09% and 23.91%. As shown in Examples 1 and 2, the level of purification is approximately equal to the weight ratios of the layers. Addition of Alum increases the percentage of impurities in the upper aqueous layer ratio and therefore improved the efficiency of the separation of residual monomer from the polymer. The addition of Alum was demonstrated to lower the LCST of the PEOx solutions.

Example 4—Multiple Separations

A 200 g sample of a 10% polymer solution in water was prepared using a 500,000 weight average molecular weight PEOx. The sample was heated in a vessel with constant stirring to 80.8° C. at which time stirring was stopped and two phases or layers formed, an aqueous water rich layer and a polymer rich layer. 97.8 g of the top aqueous rich layer was removed. The top aqueous layer and bottom polymer rich layer were analyzed for levels of monomer and NHEP. The 97.9 g aqueous phase was removed and replaced by the same amount of water. The sample became clear as the water was added and cooled the polymer rich phase. The temperature of this sample was raised to 86° C. wherein two phases or layers again formed once stirring was stopped. The layers were separated and analyzed for levels of monomer and NHEP. Table 4, provides the results of solids and residual levels.

TABLE 4

| Separation and temp. (° C.) | Solids of bottom phase | Concentration of monomer in bottom phase (ug/g) | Conc. of monomer to solids in bottom phase | Concentration of monomer in top phase | Conc. NHEP* in bottom phase | Conc. Of NHEP to solids in bottom phase | Conc. Of NHEP in top phase |
|---|---|---|---|---|---|---|---|
| #1, 80.8 | 24.8 | 0.61 | 2.45 | 0.70 | 33.69 | 135 | 31.8 |
| #2, 86.0 | 33.2 | <0.55 | <1.66 | <0.55 | 15.70 | 47 | 16.15 |
| Starting polymer | 20% solution | 1.73 | 8.6 | | 60.38 | 286 | |

*NHEP = N-(2-hydroyethyl)propenamide
All concentrations are as μg/g, also known as parts per million, and are on a weight basis.

These results indicate that the level of residual monomer dropped by 72% as a result of the first separation at 80.8° C. After a second separation the residual monomer level was reduced by more than 80.7% of the original polymer solution. At that point a limit of analytical detection was reached. After the second separation the level of NHEP was 84% less than in the starting polymer. This example shows that the process of purification may be repeated and surprisingly is still highly effective at reducing level of impurities still remaining in the product.

Example 5—Oligomers

A 5% solution of a 500,000 weight average molecular weight PEOx was prepared as described above. With constant stirring the solution was heated to 80° C. The stirring was stopped and the solution separated into a top or upper aqueous phase or layer and a lower polymer rich phase or layer. From the lower or polymer rich layer, a 25% by volume sample was taken. The initial solution before separation and the lower polymer rich phase after separation were analyzed for the amount of residual oligomers left in the sample. Residual oligomers are defined as polymer molecules below 1000 g/mole molecular weight. The study showed a level of oligomers in the starting solution as a percentage of total solids was 514 parts per million (ppm). The level of oligomers in the lower collected or polymer rich portion as a percentage of total solids was 147 ppm. Results indicated that the level of oligomers was reduced by about 71%. Surprisingly the process was found to have reduced oligomer level. We conclude that oligomers, to a large degree, did not separate from the polymer as the temperature was raised to 80°, thus surprisingly the method of the current invention can be used to reduce oligomer levels in the final purified polymer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

Any references cited in the present application above, including books, patents, published applications, journal articles and other publications, is incorporated herein by reference in its entirety.

I claim:

1. A method for the purification of a polymer solution comprising the steps of:
   a) providing a polymer solution comprising water and an oxazoline polymer having a weight average molecular weight greater than about 5000 g/mol, and one or more impurities,
   b) raising the temperature of the polymer solution from a first temperature to a second temperature that is above a lower critical solution temperature (LCST), wherein the polymer solution separates into a predominantly water phase and a polymer-rich phase;
   c) separating the water phase from the polymer phase;
   d) cooling the polymer phase to a third temperature such that a purified soluble polymer solution forms and has an amount of the one or more impurities that is less than an amount of the one or more impurities present in the polymer solution; and
   e) optionally repeating steps b), c) and d).

2. The method according to claim 1, wherein the polymer solution comprises poly-2-ethyl oxazoline.

3. The method according to claim 1, wherein the impurities can be residual monomers and oligomers, initiators, production aids, and non-polymeric materials.

4. The method of claim 3, wherein the level of oligomers in the final polymer layer on a basis of the weight of the polymer has been reduced by greater than 50 wt %.

5. The method of claim 4, wherein the level of oligomers in the final polymer layer on a basis of the weight of the polymer has been reduced by greater than 65 wt %.

6. The method of claim 5, wherein the level of oligomers in the final polymer layer on a basis of the weight of the polymer has been reduced by greater than 75 wt %.

7. The method according to claim 1, wherein the second temperature of step b) is from about 65° C. to about 85° C.

8. The method according to claim 1, wherein step d) comprises cooling the polymer phase via the addition of water.

9. The method according to claim 1, the viscosity of the polymer phase is between 10 and 2000 cps.

10. The method of claim 1, wherein the weight average molecular weight of the polymer is greater than about 50,000 g/mol and optionally greater than about 200,000 g/mol.

11. The method of claim 1, further comprising the step of drying the polymer phase subsequent to step d).

12. The method of claim 1, wherein the polymer solution is provided as a continuous feed.

13. The method of claim 1, wherein the polymer solution further comprises a water soluble aluminum salt.

14. The method of claim 1, wherein the total amount of impurities in the final polymer layer on a basis of the weight of the polymer is reduced by greater than 50%.

15. The method of claim 14, wherein the total amount of impurities in the final polymer layer on a basis of the weight of the polymer is reduced by greater than 65 wt %.

16. The method of claim 15, wherein the total amount of impurities in the final polymer layer on a basis of the weight of the polymer is reduced by greater than 75 wt %.

17. A method for the purification of poly-2-ethyl oxazoline (PEOx) comprising the steps of:
  a) providing an aqueous solution containing one or more impurities and PEOx;
  b) raising the temperature of the aqueous solution from a first temperature to a second temperature that is a lower critical solution temperature, wherein the aqueous solution separates into a water phase and a polymer rich phase;
  c) separating the polymer rich phase from the water phase; wherein the polymer rich phase is more dense and contains a predominance of the PEOx polymer and the water phase contains a portion of the one or more impurities;
  d) cooling the polymer phase to a third temperature allowing the polymer phase to return to an aqueous solution; and
  e) optionally repeating steps b), c) and d).

18. The method of claim 17, wherein the impurities can be residual monomers and oligomers, initiators, production aids, and non-polymeric materials.

19. The method of claim 18, wherein the impurity is residual oligomers.

20. The method of claim 17, wherein the impurities of the polymer rich phase is reduced by up to 50% of the initial aqueous solution.

* * * * *